(12) United States Patent
Benisty

(10) Patent No.: US 12,001,720 B2
(45) Date of Patent: *Jun. 4, 2024

(54) CONTROLLER FOR QUALITY OF SERVICE BASED ARBITRATIONS

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/860,203

(22) Filed: Jul. 8, 2022

(65) Prior Publication Data

US 2022/0342607 A1 Oct. 27, 2022

Related U.S. Application Data

(62) Division of application No. 16/931,309, filed on Jul. 16, 2020, now Pat. No. 11,385,835, which is a (Continued)

(51) Int. Cl.
*G06F 3/06* (2006.01)
*G06F 13/16* (2006.01)
*G06F 13/42* (2006.01)

(52) U.S. Cl.
CPC .......... *G06F 3/0659* (2013.01); *G06F 3/0611* (2013.01); *G06F 3/0679* (2013.01); (Continued)

(58) Field of Classification Search
CPC .... G06F 3/0659; G06F 3/0611; G06F 3/0679; G06F 13/1668; G06F 13/4282; G06F 2213/0032; G06F 13/102; G06F 13/1605
See application file for complete search history.

(56) References Cited

U.S. PATENT DOCUMENTS

| 4,530,055 A | 7/1985 | Hamstra et al. |
| 7,672,303 B1 | 3/2010 | Baxter, III et al. |

(Continued)

FOREIGN PATENT DOCUMENTS

| CN | 1773475 A | 5/2006 |
| CN | 103620570 A | 3/2014 |

(Continued)

OTHER PUBLICATIONS

Tavakol et al. "FLIN: Enabling Fairness and Enhancing Performance in Modern NVMe Solid State Drives," 2018 ACM/IEEE 45th Annual International Symposium on Computer Architecture (ISCA), Los Angeles, CA, 2018, pp. 397-410, doi: 10.1109/ISCA.2018.00041.

(Continued)

*Primary Examiner* — Zhuo H Li

(74) *Attorney, Agent, or Firm* — PATTERSON + SHERIDAN, LLP

(57) ABSTRACT

A method and apparatus for operating a solid state drive is disclosed comprising receiving at least two commands from a host requiring an action by the solid state drive in a preliminary order, ordering the at least two commands based upon a quality of service classification for the at least two commands to a final order and executing the at least two commands on the solid state drive in the final order, wherein an operational parameter of the solid state drive is modified by at least one of the at least two commands.

20 Claims, 4 Drawing Sheets

Related U.S. Application Data division of application No. 16/026,965, filed on Jul. 3, 2018, now Pat. No. 10,732,897.

(52) U.S. Cl.
CPC ...... *G06F 13/1668* (2013.01); *G06F 13/4282* (2013.01); *G06F 2213/0032* (2013.01)

(56) References Cited

U.S. PATENT DOCUMENTS

| | | | |
|---|---|---|---|
| 7,739,436 B2* | 6/2010 | Meyer | G06F 13/364 |
| | | | 710/111 |
| 9,727,503 B2* | 8/2017 | Kagan | G06F 13/28 |
| 10,732,897 B2* | 8/2020 | Benisty | G06F 3/0659 |
| 11,385,835 B2* | 7/2022 | Benisty | G06F 13/4282 |
| 11,709,635 B2* | 7/2023 | Benisty | G06F 13/1668 |
| | | | 711/133 |
| 2006/0095634 A1 | 5/2006 | Meyer | |
| 2006/0123169 A1 | 6/2006 | Chai et al. | |
| 2009/0165008 A1* | 6/2009 | Liu | G06F 3/0659 |
| | | | 718/103 |
| 2012/0331019 A1 | 12/2012 | Schreter | |
| 2014/0282579 A1 | 9/2014 | Smiley et al. | |
| 2016/0283119 A1 | 9/2016 | Frickey, III et al. | |
| 2016/0291878 A1* | 10/2016 | Kang | G06F 3/0679 |
| 2017/0075824 A1 | 3/2017 | Haen et al. | |
| 2017/0123659 A1 | 5/2017 | Nam et al. | |
| 2018/0275923 A1 | 9/2018 | Earhart et al. | |
| 2018/0321844 A1* | 11/2018 | Benisty | G06F 13/1642 |
| 2018/0321945 A1 | 11/2018 | Benisty | |
| 2019/0179760 A1* | 6/2019 | Bhargava | G06F 12/0893 |
| 2020/0012451 A1 | 1/2020 | Benisty | |
| 2020/0142843 A1* | 5/2020 | Hung | G06F 3/0611 |
| 2020/0210104 A1 | 7/2020 | Grosz et al. | |
| 2020/0326890 A1 | 10/2020 | Benisty | |
| 2020/0348889 A1 | 11/2020 | Benisty | |

FOREIGN PATENT DOCUMENTS

| | | |
|---|---|---|
| CN | 104679582 A | 6/2015 |
| CN | 107835989 A | 3/2018 |

OTHER PUBLICATIONS

Kim et al. "Optimized I/O Determinism for Emerging NVM-based NVMe SSD in an Enterprise System," 2018 55th ACM/ESDA/IEEE Design Automation Conference (DAC), San Francisco, CA, 2018, pp. 1-6, doi: 10.1109/DAC.2018.8465867.

\* cited by examiner

CONTROLLER FOR QUALITY OF SERVICE BASED ARBITRATIONS

CROSS-REFERENCE TO RELATED APPLICATIONS

This application is a divisional of co-pending U.S. patent application Ser. No. 16/931,309, filed Jul. 16, 2020, which application is a divisional of U.S. patent application Ser. No. 16/026,965, filed Jul. 3, 2018, now U.S. Pat. No. 10,732,897, each of which is herein incorporated by reference.

FIELD OF THE DISCLOSURE

Aspects of the disclosure relate to memory arrangements. More specifically, aspects relate to solid state drives (SSDs) that are optimized for enterprise operations based on quality of service based arbitrations.

BACKGROUND OF THE DISCLOSURE

Field of the Disclosure

NVM Express (NVMe) is a standard that has been created to allow non-volatile storage media to be accessed when the media is attached to a PCI Express (PCIe) bus. NVMe may be used with a variety of types of non-volatile storage media. One such type of media is a SSD. The NVMe standard was created to focus on several features, including input/output (I/O) operations between a host device and a memory device. The NVMe standard allows for different manufacturers of SSDs, for example, to be used with a host computer, provided that the standard is maintained.

NVMe uses different queues to achieve processing of data. As a non-limiting example, NVMe uses a paired submission queue and a completion queue to accept data from a host and to notify a host that processing is complete. As an example, host software, located within a host computer, may place a command into the submission queue for an SSD. The SSD, non-volatile storage media, with an accompanying controller, may process the command on the submission queue and then place completions on an associated completion queue.

Quality of service is an important factor in the design of a non-volatile memory. Maintaining high levels of quality of service, despite high workloads, is important for the overall performance and quality of a user. Commands that are placed upon the submission queue, for example, should be processed in not only an orderly fashion, but also within a predefined time limit so that latency is not experienced. Conventional non-volatile memory arrangements, however, receive commands in a serial format and process these commands as received. Some commands, which are not required to be immediately processed, may be immediately processed, while other commands that require to be processed expeditiously, may be forced to wait for processing. The processing, therefore, is non-optimal.

There is a need to perform processing of commands in an expeditious manner for non-volatile memory arrangements, such as solid state drives.

There is also a need to perform an arbitration between different commands in queues such that processing occurs on the commands that are more urgent.

There is a further need to provide for increased quality of service for solid state drives compared to conventional systems.

SUMMARY OF THE DISCLOSURE

The following summary is provided for describing aspects of the disclosure and should not be considered limiting of the scope of the aspects described. A method and apparatus for operating a solid state drive is disclosed comprising receiving at least two commands from a host requiring an action by the solid state drive in a preliminary order, ordering the at least two commands based upon a quality of service classification for the at least two commands to a final order and executing the at least two commands on the solid state drive in the final order, wherein an operational parameter of the solid state drive is modified by at least one of the at least two commands.

In one non-limiting embodiment, a method of operating a solid state drive, is disclosed comprising receiving at least two commands from a host requiring an action by the solid state drive in a preliminary order, ordering the at least two commands based upon a quality of service classification for the at least two commands to a final order and executing the at least two commands on the solid state drive in the final order, wherein an operational parameter of the solid state drive is modified by at least one of the at least two commands.

In another non-limiting embodiment, a method of operating a memory arrangement is disclosed comprising: receiving at least two commands from a host through an interface of the memory arrangement, timestamping each of the at least two commands upon receipt of the commands at the interface, arbitrating each of the at least two commands to create a final order for the performing each of the at least two commands and executing the at least two commands in the memory arrangement in the final order, wherein an operational parameter of the memory is modified by at least one of the at least two commands.

In another non-limiting embodiment, a device controller for a memory arrangement device is disclosed comprising: an interface module configured to transmit and receive data from at least one memory array of the memory arrangement device, a host interface module configured to transmit and receive data from a host, a time stamp arrangement configured to record a time when a command is received from the host through the host interface module, the time stamp arrangement connected to the host interface module, a command arbitration arrangement connected to the host interface module, the command arbitration arrangement configured to receive commands received by the host interface module and arbitrate an operational order for the received commands, a command queueing arrangement connected to the host interface and the interface module, wherein the command queueing arrangement is configured to accept commands placed in an order by the command arbitration arrangement.

In another non-limiting embodiment, a memory device is disclosed comprising: at least one memory array configured to store data provided to the array; an interface module configured to transmit and receive data from at least one memory array, a host interface module configured to transmit and receive data from a host, a time stamp arrangement configured to record a time when a command is received from the host through the host interface module, the time stamp arrangement connected to the host interface module, a command arbitration arrangement connected to the host interface module, the command arbitration arrangement configured to receive commands received by the host interface module and arbitrate an operational order for the received commands and a command queueing arrangement connected to the host interface and the interface module, wherein the command queueing arrangement is configured to accept commands placed in an order by the command arbitration arrangement.

In another non-limiting embodiment, an arrangement for operating a solid state drive is disclosed comprising means for receiving at least two commands from a host requiring an action by the solid state drive in a preliminary order, means for ordering the at least two commands based upon a quality of service classification for the at least two commands to a final order and means for executing at least one command on the solid state drive of the at least two commands in the final order, wherein an operational parameter of the solid state drive is modified by at least one of the at least two commands.

In another non-limiting embodiment, an apparatus for operating a memory arrangement is disclosed comprising means for receiving at least two commands from a host through an interface of the memory arrangement, means for timestamping each of the at least two commands upon receipt of the commands at the interface, means for arbitrating each of the at least two commands to create a final order for the performing each of the at least two commands, wherein the means for arbitrating is performed through a weighted round robin algorithm and means for executing the at least two commands in the memory arrangement in the final order, wherein an operational parameter of the memory is modified by at least one of the at least two commands.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
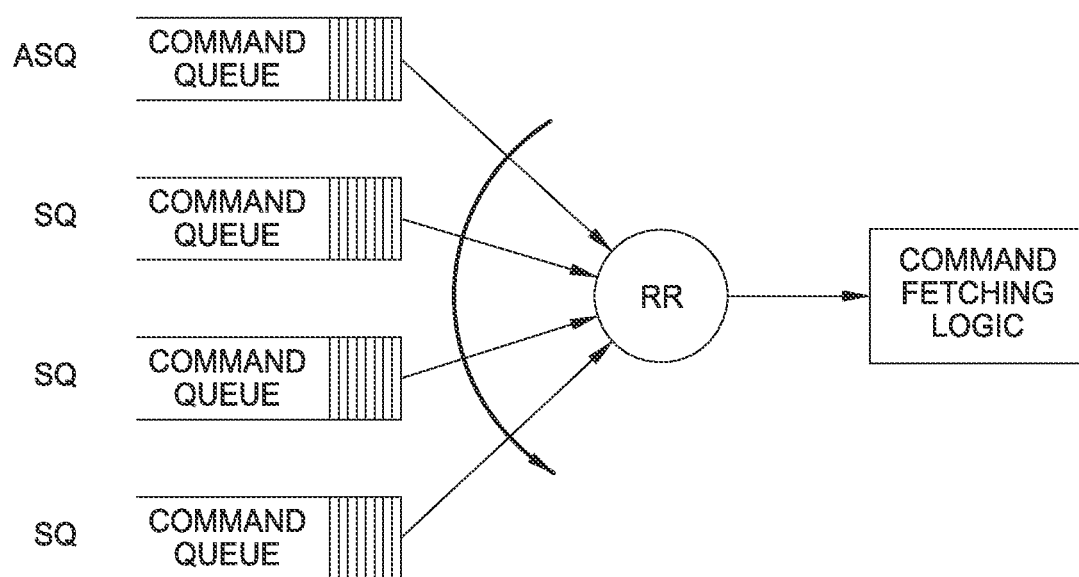
FIG. 1 is a non-volatile memory (NVMe) arbiter processing command queues.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage and specifically, enhancing operations of a storage device that is connected to a computer host. The function of the memory arrangement is to accept data and store the data until needed again by a user or the host. The arrangement may be configured to accept bursts of data, depending on the computer process performed, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host computer. The interface may be a SAS Interface or Serial ATA (SATA) compatible interface, as a non-limiting embodiments. The memory storage may have a configuration to allow for plug and play capability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SATA compatible, other types of interfaces may be used.

Auxiliary connections may be provided to the data storage arrangement to allow for additional options for inputting data directly to the data storage arrangement without interfacing with the host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use. The controller, for example, may be an application specific integrated circuit (ASIC) or other configuration that accepts commands from a host and then controls operations of the solid state drive or memory arrangement.

Internal software may be provided with the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Security protocols may take several forms. Protocols may be in the form of password protection, such as a Wi-Fi password protection. In embodiments, software may be used in conjunction with the data storage arrangement to allow the data storage arrangement to create a hardware lock. Such hardware locks, for example, may prevent access to a host computer through a universal serial bus connection.

Memory arrangement software may also provide other benefits. Such benefits can include diagnostic support of the memory arrangement. Data obtained may be directly supplied to a user or may be fed into other types of software that may analyze obtained data. In one example configuration, two different modes may be provided. A first mode may provide a quick test software program may be provided with the capability to check the data storage arrangement for major performance problems. A second mode may provide a full test mode which may also be provided to provide detailed status information to a user. Data may be provided to the user which may include, for example, a firmware version of the software, a total amount of memory of the data storage arrangement, the amount of memory storage used, storage divisions provided on the data storage arrangement, memory block errors, energy usage, age of the device and similar data.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems or other data storage systems. In the event that the data storage arrangement approaches the limits of storage capability, the data storage arrangement may allow for some of the data to be stored on cloud based systems or other data storage systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting embodiments. Different form factors may also be provided. In the illustrated embodiment, a form factor of 2.5 inches is provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

Aspects of the disclosure relate to NVMe systems and processing of commands that are received, for example, from a host. In NVMe systems, processing of commands generally follows a sequence of phases. In a first phase, the host device (a computer, cell phone or other computing device) places a command in a submission queue (SQ), and thereafter notifies the memory device that the command has been placed in a submission queue. The NVME system reacts to the notification by the host device, and the NVMe fetches the command from the submission queue. Thereafter, the NVMe processes the command according to the needs of the host. In one non-limiting embodiment, the memory device performs internal command selection, and then executes the command. The command may be a performance of a read or write command. After processing the command, the memory device places an entry on the completion queue, with the entry indicating that the execution of the command has completed. The memory device then generates an interrupt command to the host device indicating that an entry has been placed on the completion queue. After the placement of the command on the completion queue, the host device reviews the data on the completion queue. The host device then notifies the memory device that the entry on the completion queue has been reviewed.

A host device may use and configure multiple submission queues to aid in processing. The host device may place commands on respective submission queues which are then handled by the storage device and controller of the storage device. To enable the storage device to choose which command on a submission queue to process, the memory device may use one or more arbitration schemes in order to determine the order of the commands to fetch from the multiple submission queues. One type of submission queue is an administrative submission queue, which includes administrative commands to the memory device. Other queues may be submission queues.

In certain embodiments, the administrative submission queue may be assigned a high priority (or the highest priority relative to other submission queues). The other submission queues, however, may be priorities that are lower than the administrative submission queue. Priority of the commands may proceed in the following order (in decreasing order of priority): urgent, high priority, medium priority and low priority. Commands on other submission queues may relate to data transfer, such as read commands (e.g. reading data from the flash memory) and write commands (e.g., writing data to the flash memory). The host device may assign a respective priority to a submission queue at initialization of the submission queue.

In determining which commands to fetch from the submission queues, an algorithm may be used. In one example embodiment, the memory device may use an arbitration algorithm, such as a round-robin algorithm or a weighted round-robin algorithm. These algorithms may determine the order in which to fetch commands from multiple submission queues as well as administrative queues. Using the round-robin algorithm, for example, the memory device selects the commands placed in the different submission queues in a symmetrical manner. The round-robin algorithm fetches commands from the different queues in a predetermined order regardless of priority of the submission queue. With the weighted round robin approach, however, the memory device selects the commands placed in the different submission queues in a non-symmetric way in which each submission queue has its own priority assigned by the host device at the initialization phase.

In one non-limiting embodiment, a weighted round robin algorithm may determine if there is a command that is urgent. The command may be placed in the administrative submission queue or a submission queue. If there is no command that is noted as urgent, then the weighted round-robin algorithm may weight commands on "high priority", "medium priority", and "low priority" submission queues to determine which commands to fetch (e.g. weight the commands on the high priority" submission queues higher than the commands on the "medium priority" or "low priority" submission queues.

In another non-limiting embodiment, the memory device may use a static arbitration algorithm, such as a round robin approach, in which certain queues are given higher priority than other queues. For example, fetching commands from an administrative submission queue may be given higher priority than fetching commands from other submission queues not designated as an administration queue since the administrative queue is assigned the highest priority.

In one implementation, the memory device may determine a priority for performing the phases after fetching the command(s) from the queues. As provided above, example phases after fetching include: processing the command (e.g., performing internal command selection, executing the command, such as data transfer), posting the completion message; and generating an interrupt to the host device indicating that an entry has been placed on the completion queue. The listed phases after fetching are merely for illustrative purposes.

The memory device, such as an SSD, may determine priority for a command (or for performing one or more phases) based on one or more criteria including any one, any combination or all of the following: (1) priority of the respective command; (2) internals of the memory device (e.g., the state of the die or the processing capability of the memory device, as discussed below); (3) power consumption; (4) state of the communication interface between the host device and the memory device (e.g., the status of the ingress and/or egress path); and (5) the phases of the commands subject to execution. As a result, commands may be executed based on a basis other than the time that a command was received. Different priorities may be placed on the above-identified criteria. For example, if the SSD is located within a laptop computer where battery energy is rapidly diminishing, power consumption parameters may be the most important priority factors. Thus, a delaying of the commands that use excessive power may be appropriate for a user.

The memory device may determine the priority of the command according to several methods. In a first method, a command priority may be determined based on the respective submission queue on which the command was placed. In differing implementations, upon initialization of a particular submission queue, the host device may assign a priority to the particular submission queue. Thereafter, the memory device may determine the particular submission queue on which the command was placed, and assign the priority of the particular submission queue to the respective command. A host device may configure an administrative submission queue upon initialization and assign the highest priority, as discussed above, as such administrative submission queue activities may be needed to be performed prior to conducting other less critical activities. In other specific implementations, the memory device may determine the priority for a respective completion queue based on the priority of the submission queue that is associated with the respective completion queue.

The memory device is configured to determine a priority of the commands given to it based on one or more aspects of the command. As a first example, the memory device may use a Logical Block Address to determine the priority of the respective command. For example, the memory device may assign a specific priority to a command that includes an address within a given range that is frequently accessed by the memory device, than to other commands outside of a specific address range. In this example, commands that require access to specific ranges are processed more quickly. In a second example, a type of command may be used to provide instruction to the memory device on the level of priority for the command. For example, a forced unit access (FUA) command is a command that instructs the memory device to store data to the flash memory (as opposed to storing the data in cache). In specific embodiments, the memory device may treat an FUA command as urgent as the memory device cannot post an entry to the completion queue for this command until the data is stored in the flash memory. The memory device controller, for example, may include a table that correlates types of commands to levels of urgency. In a third example, the memory device may prioritize the command based on the size of the data transfer of the command. In particular, the memory device may prioritize commands that dictate that small amount of data to be read from flash memory as opposed to comparatively larger amounts of data. In a fourth example, the memory device may analyze randomness of at least one aspect associated with the command, and determine, based on the analyzed randomness of at least one aspect associated with the command, and determine, based on the analyzed randomness, the priority of the command. In one example embodiment, a device, such as a memory device analyzes the memory location (or set of locations) that are the subject of a read command. In response to determining that the memory location(s) are random (no pattern of reading from this memory location), the memory device may assign a specific priority to the command. As an example, the specific priority may be a higher command. Thus, in one implementation, a higher degree of randomness of a command may indicate a greater importance to the host device compared to non-random commands, and therefore correlates to a higher priority assigned for the random command by the memory device. One phase after a fetching operation is an internal command selection, which may comprise (1) command queuing and (2) command scheduling. In one implementation, the internal command selection may be performed by the memory device based on internals of the memory device, such as the internal state machine of the memory device and/or the internal states of the flash die(s). As an example, a die of the flash memory may be in one of several states, and may unavailable for performing operations. For example, which data is being written to a flash die, the flash die is in the program state and cannot be accessed. In another embodiment, if the flash die is performing garbage collection, the flash die may be unavailable. Execution of commands, such as read or write commands, is dependent on the state of the particular die. The memory device controller may execute the commands on flash dies that are available for operation. In a like manner, the memory device controller may delay execution on flash dies that are unavailable. In another implementation, the memory device controller may select the phase of operation based on the processing capacity of the memory device controller. As discussed herein, reads from the flash memory may further include error correction, encryption or decryption, and the like. Operations of these commands and functions may be computationally intensive. As such, depending on the current processing capacity of the memory device controller, the memory device controller may select phases of operation. For example, in response to determining that the memory device controller's current processing capacity is reduced, the memory device controller may select phases of operation that are less computationally intensive (such as sending a read request to the host device). In response to determining that the memory device controller has available processing capacity, the memory device controller may select phases of operation that are more computationally intensive, the memory device controller may select phases of operation that are more computationally intensive (such as reading data from the flash memory, performing error correction and decryption). In still another implementation, the memory device controller may arbitrate amongst commands that are in a same phase. Such arbitration may be accomplished through arbitration arrangements placed within the controller. For example, a set of commands may be in the execution phase, such as performing a write to or a read from the flash memory. The memory device controller may prioritize all commands that are operating in a particular phase (such as the execution phase). Alternatively, the memory device controller may prioritize a certain type of command that is operating in a particular phase (such as all read commands in the execution phase or all write commands in the execution phase).

In another non-limiting embodiment, the memory device may perform an internal command selection based on a priority associated with the command. As discussed above, priority may be determined in one of several ways, including, for example, the priority of the submission queue from which the command was fetched, the type of command, or the address range of the command. In some implementations, the memory may perform the internal command selection based on both the priority associated with the command and the internals of the memory device (e.g., the internal state machine of the memory device and/or the internal states of the flash die(s)).

NVM Express is based on a paired submission and completion queue mechanism. Commands are placed by host software into a submission queue in the host and then transmitted to a solid state drive, for example. Completions (actions that are completed by the SSD) are placed into the associated completion queue by the controller of the SSD. Submission and completion queues are allocated in host memory.

Enterprise SSD markets have different requirements, especially in quality of service (QoS) requirements. QoS is extremely important in enterprise operations and therefore strict requirements are defined. Several benchmarks have been established to test devices, such as SSDs, to ensure users have good results in specific areas. One example of these types of requirements is latency of input/output (I/O) commands. In SSDs, generally, there are strict requirements in performance, but not in latency. In one example embodiment, requirements or benchmarks are established for random read commands. In this example embodiment, 99 percent of the commands should be completed in 300 μS while 99.9% of the commands should be completed in 400 μS. As provided in Table 1 below, a maximum timeout value is also provided. Furthermore, the number of operations needed in a specific test is provided in the right column. The center columns provide the number of pS needed under 4 kB, 8 kB and 64 kB processing.

TABLE 1

|  |  | 4 kB (μs) | 8 kB (μs) | 64 kB (μs) | Operations Needed in Test* |
|---|---|---|---|---|---|
| Average |  | 240 | 250 | 450 | — |
| 99% | (2 nines) | 300 | 360 | 770 | >100 |
| 99.9% | (3 nines) | 400 | 380 | 1,000 | >1,000 |
| 99.99% | (4 nines) | 500 | 550 | 3,000 | >10,000 |
| 99.999% | (5 nines) | 1,000 | 2,000 | 3,500 | >1e5 |
| 99.9999% | (6 nines) | 3,000 | 4,000 | 5,000 | >1e6 |
| 99.99999% | (7 nines) | 5,000 | 6,000 | 8,000 | >1e7 |
| 99.999999% | (8 nines) | 7,000 | 8,000 | 10,000 | >1e8 |
| Maximum Timeout |  | 11,000 | 12,000 | 20,000 | — |

According to Table 1, the percentages of completion are extremely high over a longer term test. Aspect herein provide for a storage device that is highly optimized to achieve the requirements in Table 1, while not significantly impacting other criteria such as performance, power and area. By logically processing needed commands, while delaying other, less necessary, commands, overall processing is improved for the user. Such processing methods are substantially different than conventional processes that do not use informed or prioritized markers or flags on commands signifying the need for urgent processing.

Aspects described herein do not add parallelism interconnections or logical arrangements to achieve the requirements of Table 1. A device controller that is adaptive and optimized for QoS in each step of the processing pipeline, from initiation to posting of an interrupt to a host, is provided. For each command, the device controller captures a timestamp of a host issuing a relevant command "doorbell". A first phase of the pipeline involves a fetch command. An aging algorithm may also be added to the NVMe queue arbitration algorithm so QoS requirements are not lost. The next phase in the pipeline is command selection. At this phase, the selection of the next command for execution is based on an intelligent QoS algorithm. All pending commands are evaluated and classified into specific classes.

In a non-limiting embodiment, "Class A" commands may represent 99% of the commands (which must be completed in a range of between 300-400 µS). In a separate class, "Class B" commands account for a smaller percentage of commands, for example 0.9% (which must be completed within the 300-400 µS timeframe). The above classifications may be based on evaluation and prediction and impacted by SLC/TLC zones, last access time and a doorbell timestamp. The command selection algorithm may take all of these factors into account. An arbitration may be implemented in each phase in the pipeline stages while each phase in the pipe has more knowledge and therefore can adapt the arbitration by delaying or providing higher priority to specific operations.

Referring to FIG. 1, an NVMe Round Robin arbiter is illustrated. Four (4) different command queues are illustrated providing an input into the Round Robin (RR) arbiter. One of the inputs comes from an administrative queue (ASQ) and three of the inputs are provided from submission queues (SQ). As illustrated in FIG. 1, the Round Robin arbiter selects among the different command queues in a symmetric way.

Figure 2:
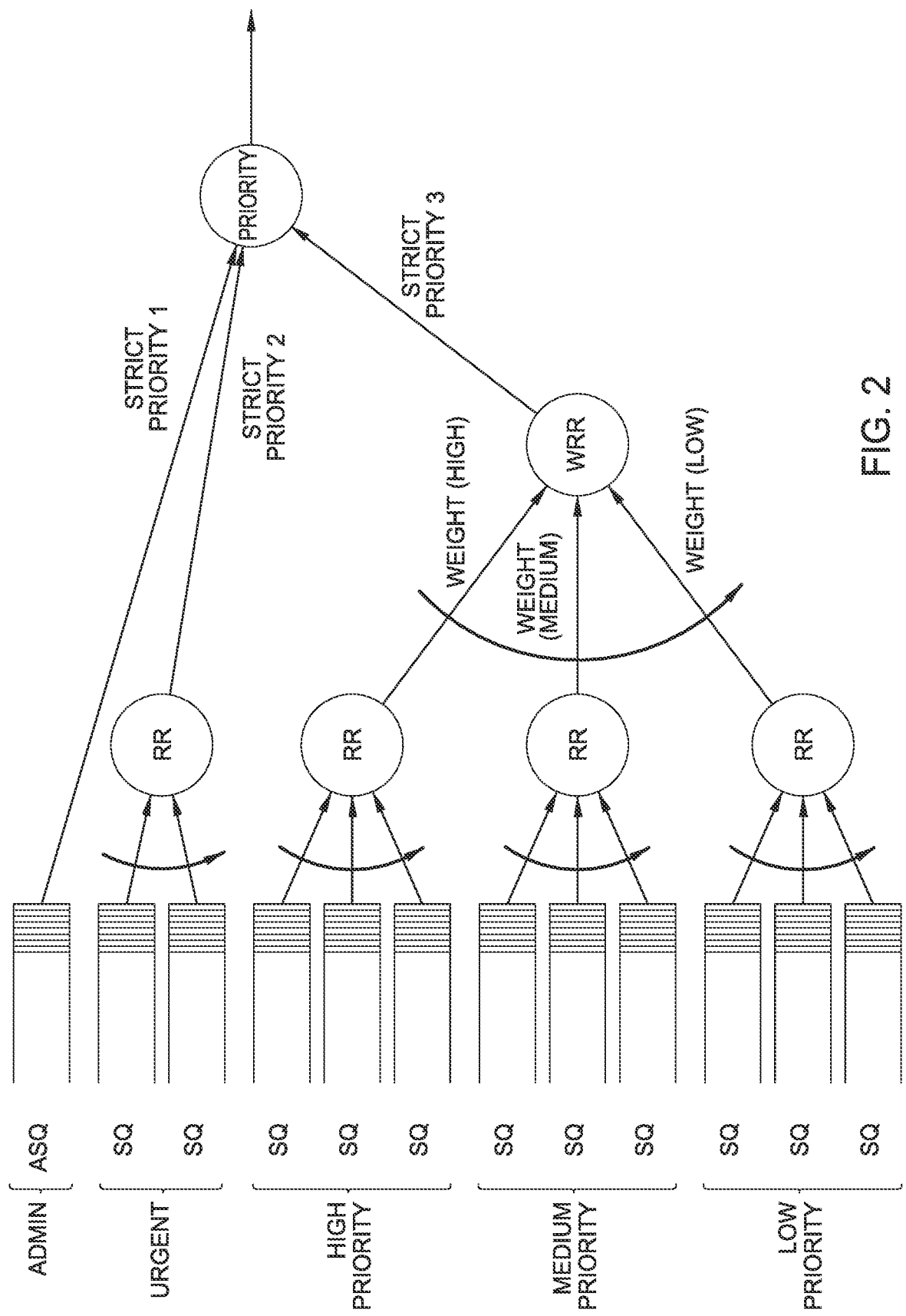
FIG. 2 is a NVMe weighted round robin (WRR) arbiter processing commands for urgent, high priority, medium and low priority as well as administrative commands.

Referring to FIG. 2, an NVMe Weighted Round Robin (WRR) arbiter is illustrated. The algorithm associated with this arbiter selects between different host SQs in a non-symmetrical manner wherein each queue has its own priority assigned by a host at the initialization phase. In order to achieve results that are consistent with user expectations, commands are broken into urgent, high priority, medium priority, low priority and an ASQ section. ASQ's proceed under strict priority 1, the highest priority possible. Urgent SQ are sorted through a RR arbiter and are designated as strict priority 2, or the next highest possible priority. High priority SQ's, medium priority SQ's and low priority SQ's are processed through their own respective RR arbiter and then weighted as input into a WWR arbiter. The results from the WRR are designated as strict priority 3. The WRR arbiter and the RR arbiters, described as element 3 330 below, in one embodiment, are part of the device controller 324.

Non-volatile memory standards do not define arbitration algorithms implemented in a device controller, such as a SSD controller, for internal operations. Aspects described herein disclose having QoS based arbitrations in the device controller, as described later. These QoS based arbitration based pipelines are optimized for providing superior QoS operations, especially for enterprise operations. At each stage in a pipeline, where a decision must be made on which operation should be performed, an arbitration is performed, and the arbitration algorithm takes into account the QoS requirements. All pending commands are evaluated and classified into specific classes. In one non-limiting embodiment, three (3) different types of classifications may be made. Class A, for example, represents 99% of the commands (which must be completed in 300 µS), Class B represents 0.9% of the commands (which must be completed in the range of 300-400 µS), Class C represents 0.09% of the commands (which must be completed in the range of 400-500 µS). Other or different classifications may be made and the separation of commands into three different classes is merely illustrative. For example, if specific commands are known to affect performance more than others, but competing commands are noted as class B, then differing factors may be used in ultimately scheduling the commands that are affecting performance to a greater degree first. The arbitration logic selects the next command based on the classification and the remaining time to achieve the goals of, for example, Table 1. The evaluation and command classification is based on the parameters discussed below.

Command Classification Parameters

1) Doorbell timestamp—this represents the time the device controller gets a "doorbell" notification from the host associated with this specific command.
2) SLC/TLC zone—this parameter represents where the relevant user data is stored in the NAND is in SLC or TLC. SLC and TLC zones have different parameters such as latency time and bit error rate and are therefore considered in classification.
3) Die Utilization—die utilization may have an impact in the classification. If the die is currently fully utilized, the next command that uses this die will have a longer latency. Thus, if commands are specifically destined for specific dies, rerouting or delay of other less important commands may take place to ensure speed of operation.
4) BER—(bit error rate) for the relevant physical address is considered since the higher the BER is, the higher processing time is needed for error correction.
5) Device Triggered Operations—some scheduled internal long operations such as erase, garbage collection and relocations may affect the classifications as well.

Current timestamp—this represents the current timestamp. This value minus the doorbell stamp represents the time passed since the host queued this command.

Based on the above parameters, the commands are classified. Based on these classifications, the arbitration is done while taking into account the remaining time for each pending command. Once a command is classified, the algorithm tries to complete the command in a maximum allowed value while providing other commands higher priority. For example, if a command is classified in Class C (i.e. must be completed in the range of 400-500 µS), the algorithm is optimized to complete this command before the 500 µS passes, but not necessarily before 400 µS, thereby surpassing Class B commands. Such scheduling allows for other commands to be completed. As one will understand, however, if no other commands are scheduled to be completed prior to the 400 pS mark, the Class C commands may be executed immediately.

Figure 3:
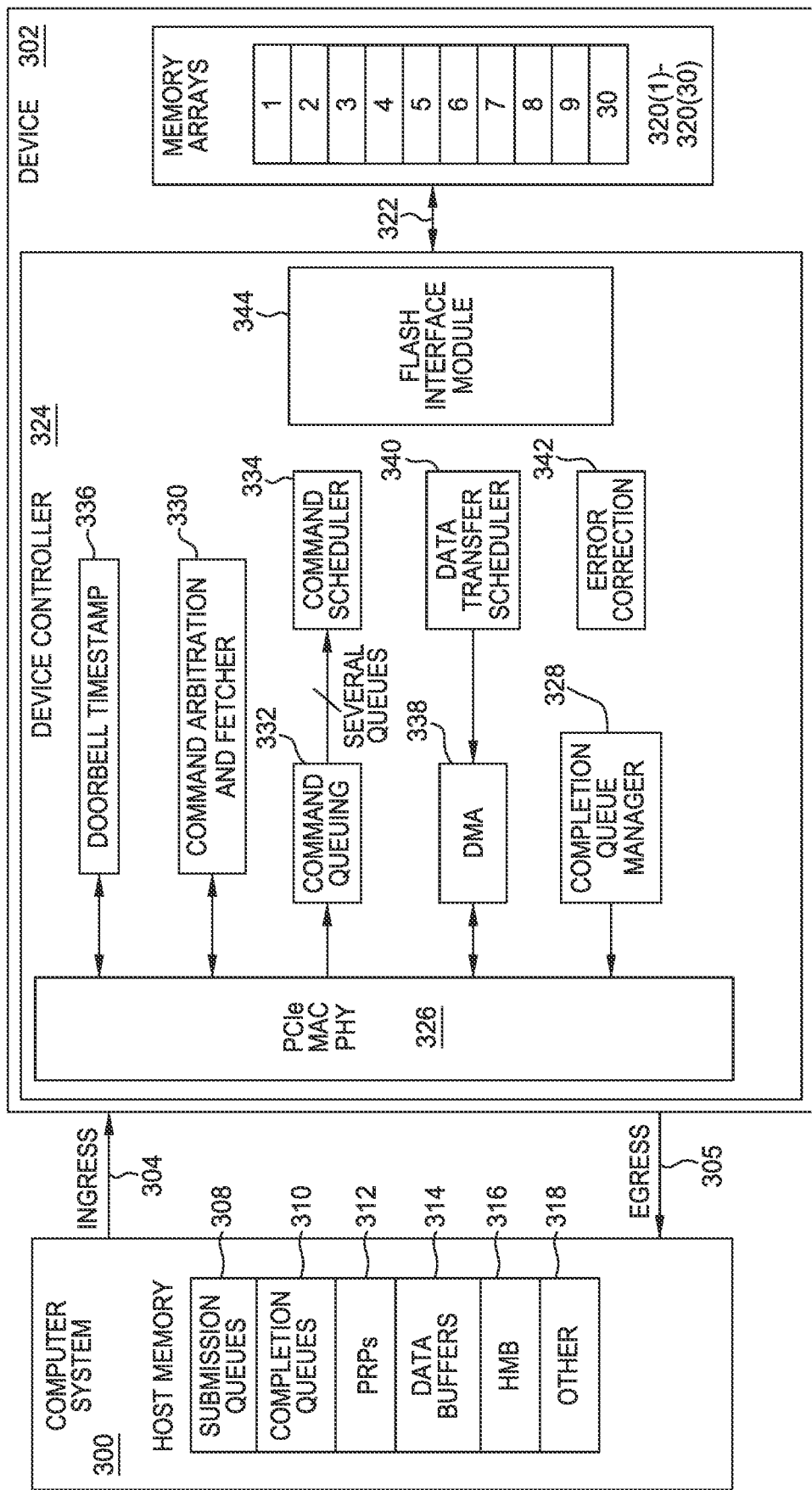
FIG. 3 is a block diagram for a memory system.

Referring to FIG. 3, a block diagram of a host computer system 300 connected to a device 302 is illustrated. The host computer system 300 provides an output which is classified as an ingress 304 to the device 302. The host computer system 300 also accepts an egress 305 from the device 302. In the illustrated non-limiting embodiment, the device 302 is a NAND based SSD. The host computer system 300 has a host memory that has submission queues 308, completion queues 310, Physical Region Pages (PRP)s 312, data buffers 314, host memory buffers (HMB) 316 as well as other 318 memory components.

Further referring to FIG. 3, the device 302 is configured to store data within different memory arrays 320(1) through 320(10). Although shown as having ten (10) different arrays, more or less arrays may be provided. Data input and output from the memory arrays 320(1) through 320(10) is provided through a data line 322. Such input and output passes to a device controller 324.

The device controller 324 has several components to allow for processing of commands. Ingress 304 and egress 305 to the device 302 from the host computer system 300 is performed through a PCIe MAC PHY interconnection 326. If commands have been completed by the device controller 324 as specified by a completion queue manager 328, then data may be transferred through the PCIe MAC PHY interconnection 326 to the completion queues 310 present in the host computer system 300.

Commands sent from the host computer system 300 that were originally placed in the submission queues 308 pass to the ingress 304, the PCIe MAC PHY interconnection 326, are time stamped by the doorbell timestamp 336 and then continue to the command arbitration and fetcher 330. The commands are arbitrated according to a selected scheme, and then sent to command queueing 332 through the PCIe MAC PHY interconnection 326. Several queues may be used or filled when the command queueing arrangement 332 performs arbiter activities. A connected command scheduler 334 may then schedule activities to be performed by the device 302 based upon the command queuing. When commands are received from the submission queues 308 through the ingress 304 through the PCIe MAC PHY interconnection 326, a doorbell time stamp may be attached by a doorbell time stamp arrangement 336 to aid in the command arbitration 330 to ensure that the performance of commands is proper in relation to Table 1, as a non-limiting example.

After a command has been scheduled through the command scheduler 334, an access to memory units may be performed through a direct memory access arrangement 338. In order to ensure that data is transferred effectively and not subject to latency, data transfers may be scheduled through a data transfer scheduler 340 that feeds information to the direct memory access arrangement 338.

Error checking may be provided by the device controller 324 to ensure that the data provided to the host computer 300 is free from errors. An error checking arrangement 342 may use different types of error checking schemes in order to ensure that the data is correct. In one non-limiting embodiment, a parity check may be accomplished for the data. Other types of embodiments are also possible. The error checking arrangement may also us a checksum routine. In still further embodiments, a cyclic redundancy check may be performed by the error correction arrangement 342.

Interface between the device controller 324 and the memory arrays 320(1)-320(10) is controlled through a flash interface module 344. The flash interface module 344 is configured to interface with the individual type of memory array provided. As will be understood, memory arrays may be NAND based or NOR based, therefore the type of flash interface module 344 is chosen according to the array used.

Figure 4:
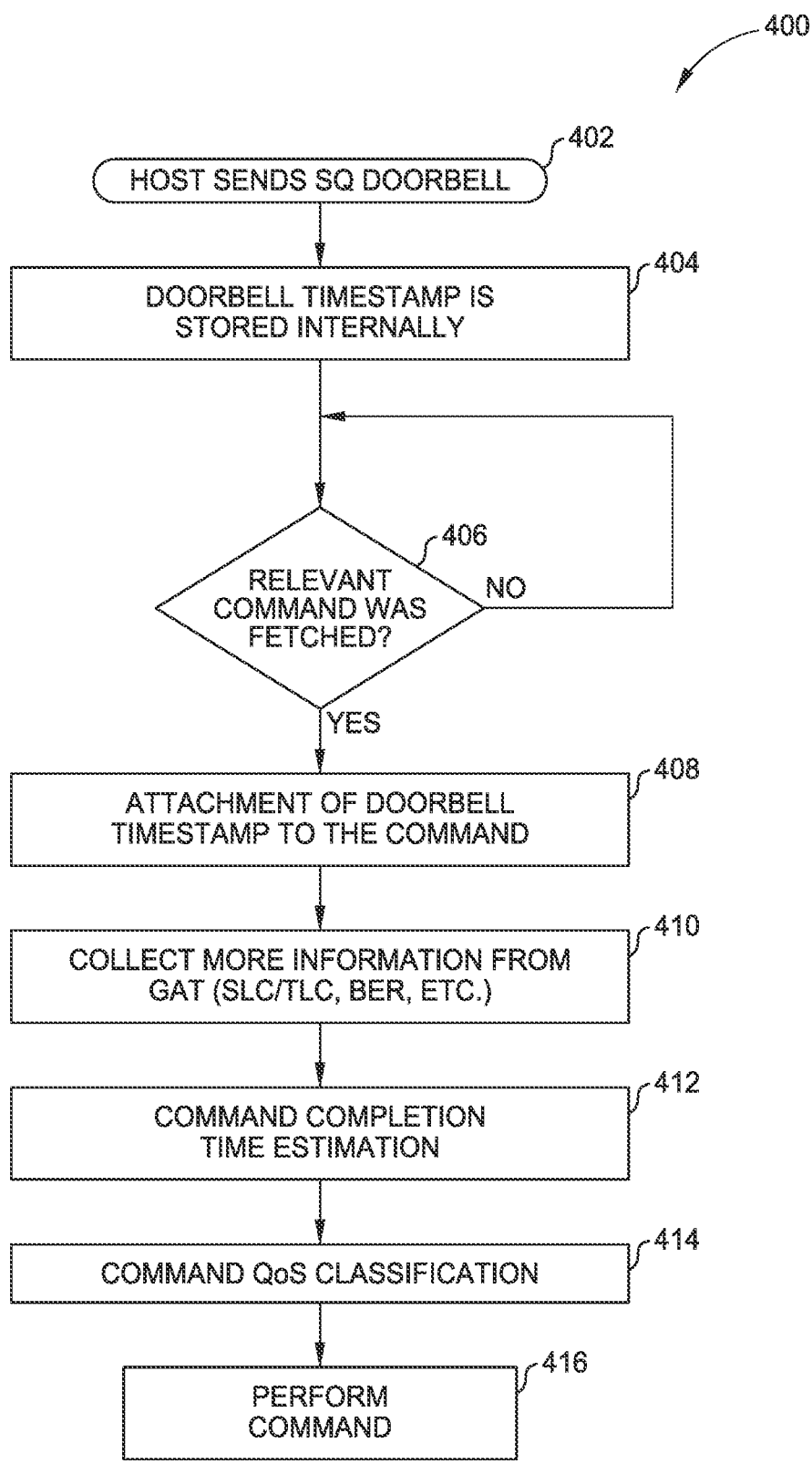
FIG. 4 is a flow chart for a method of processing a command in one non-limiting aspect described.

Referring to FIG. 4, a method 400 for performing a QoS based arbitration for a SSD is illustrated. At 402, a host sends a SQ doorbell to the SSD. At 404, the doorbell, which has been time stamped, is stored internally of the SSD. At 406, a query is run to determine if a relevant command was fetched. If no relevant command was fetched, then the method loops back to 406. At 408, if a relevant command was fetched at 406, then the doorbell timestamp is attached to the command. At 410, more information is collected from GAT. Such information may related to (SLC/TLC, bit error rate, etc.). At 412, the command completion time is estimated. At 414, the command quality of service classification is provided. At 416, the command is performed according to the command QoS classification and scheduling operations.

In order to increase the performance of the solid state drive, the device may execute several commands in parallel. In non-limiting embodiments, the device may send several PRP fetching requests which are associated with different NVMe commands. In the prior art, the arbitration mechanism was based only on the internal device states, such as, for example, memory array status. Aspects of the disclosure herein involve taking into consideration the QoS requirements while evaluating and classifying all pending commands and acting accordingly.

In NVMe, there may be several read requests generated by the host device to read data that is present within a memory array of the device. There may also be several write requests (as generated by the host device) to write data to a memory array of the device. The memory device and the host device may communicate using a transaction layer packet (TLP) request, as a non-limiting example. In one example (with the SQ resident on the host device), responsive to a TLP write request (sent via the ingress path 104) by the host device 102 to the doorbell timestamp 136 on the memory device (with the write to the doorbell register indicating that there is a command on the SQ), the memory device uses a TLP read request (sent via the egress path) to fetch the write command from the SQ (which is resident on the host device 100). The write command is a request for the memory device to write data to the non-volatile memory. The memory device then parses the write command for information, such as an indication of a PRP pointer to a PRP list. For definitional purposes, the PRP list is a series of information, such as pointers or addresses, that indicate the location of the data in the host device. The memory device may then use another TLP read request to read data from the pointers or address in the PRP list. Thereafter, the memory device performs the write command by storing data in non-volatile memory (e.g. flash memory) on the memory device. After storing the data in the non-volatile memory, the memory device uses a TLP write request to write an entry to the completion queue (CQ) (indicating that the write command has been completed). The memory device may use a TLP write request to generate an interrupt to the host device, with the interrupt signaling to the host device that there is an entry on the CQ. Responsive to the interrupt, the host device reads the entry on the CQ and then issues a TLP write request to the CQ doorbell write register indicating that the host device has reviewed the entry on the CQ. In the embodiment provided above, the CQ and SQ may be resident in the device 102, such as in a controller memory buffer.

In another example (again with the SQ and the CQ resident on the host device), responsive to a TLP write request by the host to the doorbell register on the memory device (with the write to the doorbell register indicating that there is a command on the SQ), the memory device uses a TLP read request to fetch the read command from the SQ (which is resident on the host device). The read command is requested for the memory device to read data from the non-volatile memory and to send the read data to the host device. The memory device then reads the non-volatile (e.g. flash memory) to read the data. The memory device can perform a series of operations on the data, such as error correction, encryption/decryption, etc., with storage buffers interspersed between each of the serial operation. The read command may then be parsed for information, such as an indication of a PRP to a PRP list. The PRP list is a series of information, such as pointers or addresses, that indicates the location in the host device to store the data that was read from non-volatile memory (and optionally error corrected, encrypted, etc.). The memory device may use a TLP read request to read data from the pointers or address in the PRP list. Afterward, a TLP write request is used to write the data that was read from non-volatile memory. After writing the data to the host device, the memory device uses a TLP write request to write an entry to the CQ (indicating the read command has been completed). The memory device then uses a TLP write request to generate an interrupt to the host device, with the interrupt signaling to the host device that there is an entry on the CQ. Responsive to the interrupt, the host device reads the entry on the CQ, and then issues a TLP write request to a CQ doorbell write register indicating that the host device has reviewed the entry on the CQ.

In the embodiments provided any suitable type of memory may be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM") and other semiconductor elements capable of storing information may be used. Each type of memory device may have different configurations. For example, flash memory devices may be configured in a NAND or a NOR configuration.

The memory devices can be formed from passive and/or active elements. Combinations may also be used. By way of a non-limiting example, passive semiconductor memory elements include ReRAM device elements, which in some embodiments include a resistivity switching storage element, such as an anti-fuse, phase change material, etc., and optionally a steering element, such as a diode, etc. Further by way of a non-limiting example, active semiconductor memory elements include elements containing a charge storage region, such as a floating gate, conductive nanoparticles, or a charge storage dielectric material.

Multiple memory elements may be configured so that they are connected in series. In such configurations, each element may also be individually accessible. By way of a non-limiting example, flash memory devices in a NAND configuration (NAND memory) may contain memory elements connected in series. A NAND memory array may be configured so that the array is composed of multiple strings of memory in which a string is composed of multiple memory elements charging a single bit line and accessed as a group. Alternatively, memory elements may be configured so that each element is individually accessible, e.g. a NOR memory array.

The semiconductor memory elements may be two or three dimensional types of arrangements. The embodiments, therefore, are therefore not limited to a specific arrangement for the memory elements.

In a two dimensional memory structure, the semiconductor memory elements are arranged in a single plane or a single memory device level. In a two dimensional memory structure, for example, memory elements are arranged in a plane (e.g. in an x-z direction plane) which extends substantially parallel to a major surface of a substrate that supports the memory elements. As a non-limiting example, the substrate may include a semiconductor such as silicon.

The memory elements may be arranged in the single memory device level in an ordered array, such as in a plurality of rows and/or columns. In other configurations, the memory elements may be arrayed in non-regular or non-orthogonal configurations. The memory elements may each have two or more electrodes or contact lines, such as bit lines and word lines.

In embodiments where there is a three dimensional memory array, the three dimensional memory array is arranged so that memory elements occupy multiple planes or multiple memory device levels, thereby forming a structure in three dimensions (i.e. in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e. in the y direction) with each column having multiple memory elements in each column. The columns may be arranged in a two dimensional configuration, e.g. in an x-z plane, resulting in a three dimensional arrangement of memory element with elements on multiple vertically stacked memory planes.

By way of non-limiting example, in a three dimensional NAND memory array, the memory element may be coupled together to form a NAND strings. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

In a monolithic three dimensional memory array, one or more memory device levels may be formed above a single substrate. Optionally, the monolithic three dimensional memory array may also have one or more memory layers at least partially within the single substrate. As a non-limiting example, the substrate may include different semiconductor materials, such as silicon. In a monolithic three dimensional array, the layers constituting each memory device level of the array are typically formed on the layers of the underlying memory device levels of the array. Layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be removed or reduced from the memory device levels before stacking, but as the memory device levels are initially formed over separate substrates, the resulting memory arrays are not monolithic three dimensional memory arrays. Further, multiple two dimensional memory arrays or three dimensional memory arrays may be formed on separate chips and then packaged together to form a stacked-chip memory device.

Circuitry may be required for operation of the memory elements and for communication with the memory elements. As a non-limiting example, memory devices may have circuitry used for controlling and driving memory elements to accomplish functions such as programming and reading. As another example, a controller for memory read-wire operations may be located on a separate controller chip and/or on the same substrate as the memory element.

In one non-limiting embodiment a method of operating a solid state drive is disclosed comprising receiving at least two commands from a host requiring an action by the solid state drive in a preliminary order, ordering the at least two commands based upon a quality of service classification for the at least two commands to a final order and executing the at least two commands on the solid state drive in the final order, wherein an operational parameter of the solid state drive is modified by at least one of the at least two commands.

In another non-limiting embodiment, the method further comprises sending the at least two commands from the host to the solid state drive.

In another non-limiting embodiment, the method may further comprise sending a completion notification for each of the at least two commands from the solid state drive to the host that each of the at least two commands have been completed.

In another non-limiting embodiment, the method may further comprise sending an interrupt notification to the host upon sending the completion notification.

In another non-limiting embodiment, the method may further comprise attaching a time stamp indicating a time of arrival for each of the at least two commands at the solid state drive.

In another non-limiting embodiment, the method may be performed wherein the ordering of the at least two commands accounts for the time of arrival for each of the commands.

In another non-limiting embodiment, the method may be performed wherein the accounting for the time of arrival for each of the commands further comprises: estimating a time of completion for each of the at least two commands based on the preliminary order of completion for each of the at least two commands, comparing the estimated time of completion for each of the at least two commands to a threshold, reordering the preliminary order of completion to the final order of completion if the estimated time of completion for each of the at least two commands exceeds the threshold such that each of the at least two commands are completed by the threshold in the final order of completion.

In another non-limiting embodiment, the method may be performed wherein the reordering the preliminary order of completion accounts for a bit error rate.

In another non-limiting embodiment, the method may be performed wherein the reordering the preliminary order of completion accounts for die utilization.

In another non-limiting embodiment, the method may be performed wherein the reordering the preliminary order of completion accounts for a type of memory zone in which data is stored.

In another non-limiting embodiment, the method may be performed wherein the reordering the preliminary order of completion involves a command arbitration performed by a device controller.

In another non-limiting embodiment, the method may be performed wherein the command arbitration is performed in a weighted round robin algorithm.

In another non-limiting embodiment, the method may be performed wherein weights used for the weighted round robin algorithm are assigned to the at least two commands by the host.

In another non-limiting embodiment, the method may be performed wherein the weights used are an administrative category, an urgent category, a high priority category, a medium priority category and a low priority category.

In another non-limiting embodiment, a method of operating a memory arrangement is disclosed comprising receiving at least two commands from a host through an interface of the memory arrangement, timestamping each of the at least two commands upon receipt of the commands at the interface, arbitrating each of the at least two commands to create a final order for the performing each of the at least two commands and executing the at least two commands in the memory arrangement in the final order, wherein an operational parameter of the memory is modified by at least one of the at least two commands.

In another embodiment, the method may be accomplished wherein the arbitrating each of the at least two commands includes estimating a time of execution of each of the at least two commands and comparing the time of execution of each of the at least two commands to a threshold.

In another embodiment, the method may further comprise reordering the time of execution of each of the at least two commands when the threshold is exceeded.

In another embodiment, a device controller for a memory arrangement device is disclosed comprising an interface module configured to transmit and receive data from at least one memory array of the memory arrangement device, a host interface module configured to transmit and receive data from a host, a time stamp arrangement configured to record a time when a command is received from the host through the host interface module, the time stamp arrangement connected to the host interface module, a command arbitration arrangement connected to the host interface module, the command arbitration arrangement configured to receive commands received by the host interface module and arbitrate an operational order for the received commands; and a command queueing arrangement connected to the host interface and the interface module, wherein the command queueing arrangement is configured to accept commands placed in an order by the command arbitration arrangement.

In a further embodiment, the device controller may further comprise a completion queue manager connected to the host interface module, wherein the completion queue manager is configured to send a notification to the host, through the host interface module of a completed command.

In a further embodiment, the device controller further comprises an error correction arrangement connected to the interface module, wherein the error correction arrangement is configured to identify and correct errors in data received from the at least one memory array.

In another embodiment, a memory device is disclosed comprising at least one memory array configured to store data provided to the array, an interface module configured to transmit and receive data from at least one memory array, a host interface module configured to transmit and receive data from a host, a time stamp arrangement configured to record a time when a command is received from the host through the host interface module, the time stamp arrangement connected to the host interface module, a command arbitration arrangement connected to the host interface module, the command arbitration arrangement configured to receive commands received by the host interface module and arbitrate an operational order for the received commands; and a command queueing arrangement connected to the host interface and the interface module, wherein the command queueing arrangement is configured to accept commands placed in an order by the command arbitration arrangement.

In a further embodiment, the memory device is configured wherein the at least one memory array is a non-volatile memory array.

In a further embodiment, the memory device is configured wherein the non-volatile memory array is a NAND memory array.

In another embodiment, an arrangement for operating a solid state drive, is disclosed comprising: means for receiving at least two commands from a host requiring an action by the solid state drive in a preliminary order, means for ordering the at least two commands based upon a quality of service classification for the at least two commands to a final order and means for executing at least one command on the solid state drive of the at least two commands in the final order, wherein an operational parameter of the solid state drive is modified by at least one of the at least two commands.

In another embodiment, the arrangement may further comprise means for estimating a time of completion for each of the at least two commands based on the preliminary order of completion for each of the at least two commands, means for comparing the estimated time of completion for each of the at least two commands to a threshold and means for reordering the preliminary order of completion to the final order of completion if the estimated time of completion for each of the at least two commands exceeds the threshold such that each of the at least two commands are completed by the threshold in the final order of completion.

In a still further embodiment, the arrangement may further comprise means for sending the at least two commands from the host to the solid state drive.

In a still further embodiment, the arrangement may further comprise means for sending a completion notification for each of the at least two commands from the solid state drive to the host that each of the at least two commands have been completed.

In another non-limiting embodiment, an apparatus for operating a memory arrangement is disclosed comprising: means for receiving at least two commands from a host through an interface of the memory arrangement, means for timestamping each of the at least two commands upon receipt of the commands at the interface, means for arbitrating each of the at least two commands to create a final order for the performing each of the at least two commands, wherein the means for arbitrating is performed through a weighted round robin algorithm and means for executing the at least two commands in the memory arrangement in the final order, wherein an operational parameter of the memory is modified by at least one of the at least two commands.

In another non-limiting embodiment, an apparatus for operating a memory arrangement is disclosed comprising: means for receiving at least two commands from a host through an interface of the memory arrangement, means for timestamping each of the at least two commands upon receipt of the commands at the interface, means for arbitrating each of the at least two commands to create a final order for the performing each of the at least two commands, wherein the means for arbitrating is performed through a weighted round robin algorithm and means for executing the at least two commands in the memory arrangement in the final order, wherein an operational parameter of the memory is modified by at least one of the at least two commands.

What is claimed is:

1. A device controller for a memory arrangement device, comprising:

an interface module configured to transmit and receive data from at least one memory array of the memory arrangement device;

a host interface module configured to transmit and receive data from a host;

a time stamp arrangement configured to record a time when a command is received from the host through the host interface module, the time stamp arrangement connected to the host interface module;

a command arbitration arrangement connected to the host interface module, the command arbitration arrangement configured to receive commands received by the host interface module and arbitrate an operational order for the received commands; and a command queueing arrangement connected to the host interface module and the interface module, wherein the command queueing arrangement is configured to accept commands placed in an order by the command arbitration arrangement, wherein the order is based on an estimated time of completion for each of the commands, wherein the estimating comprises:

estimating a time of completion for at least two commands based on a preliminary order of completion for each command;

comparing the estimated time of completion for the at least two commands to a threshold; and reordering the preliminary order of completion to a final order of completion if the estimated time of completion for the at least two commands exceeds the threshold such that the at least two commands are completed by the threshold in the final order of completion.

2. The device controller of claim 1, further comprising: a completion queue manager connected to the host interface module, wherein the completion queue manager is configured to send a notification to the host, through the host interface module of a completed command.

3. The device controller of claim 2, further comprising: an error correction arrangement connected to the host interface module, wherein the error correction arrangement is configured to identify and correct errors in data received from the at least one memory array.

4. The device controller of claim 3, further comprising a direct memory access arrangement.

5. The device controller of claim 4, further comprising a data transfer scheduler coupled to the direct memory access arrangement.

6. The device controller of claim 1, further comprising a command scheduler coupled to the command queueing arrangement.

7. The device controller of claim 1, wherein the controller is configured to receive a submission queue doorbell from the host.

8. The device controller of claim 7, wherein the controller is configured to store a doorbell timestamp in the time stamp arrangement.

9. The device controller of claim 8, wherein the controller is configured to determine whether a relevant command has been fetched.

10. The device controller of claim 9, wherein the controller is configured to attach the doorbell timestamp to the relevant command.

11. The device controller of claim 10, wherein the controller is configured to collect bit error rate information.

12. The device controller of claim 10, wherein the controller is configured to estimate command completion time.

13. The device controller of claim 12, wherein the controller is configured to provide the relevant command a quality of service classification.

14. The device controller of claim 13, wherein the controller is configured to perform the command.

15. A memory device, comprising:
   at least one memory array configured to store data provided to the array;
   an interface module configured to transmit and receive data from at least one memory array;
   a host interface module configured to transmit and receive data from a host;
   a time stamp arrangement configured to record a time when a command is received from the host through the host interface module, the time stamp arrangement connected to the host interface module;
   a command arbitration arrangement connected to the host interface module, the command arbitration arrangement configured to receive commands received by the host interface module and arbitrate an operational order for the received commands; and
   a command queueing arrangement connected to the host interface module and the interface module, wherein the command queueing arrangement is configured to accept commands placed in an order by the command arbitration arrangement, wherein the order is based on an estimated time of completion for each of the commands, wherein the estimating comprises:
     estimating a time of completion for at least two commands based on a preliminary order of completion for each command;
     comparing the estimated time of completion for the at least two commands to a threshold; and
     reordering the preliminary order of completion to a final order of completion if the estimated time of completion for the at least two commands exceeds the threshold such that the at least two commands are completed by the threshold in the final order of completion.

16. The memory device of claim 15, wherein the at least one memory array is a non-volatile memory array.

17. The memory device of claim 16, wherein the non-volatile memory array is a NAND memory array.

18. The memory device of claim 15, further comprising an error correction module.

19. The memory device of claim 18, further comprising a command scheduler coupled to the command queueing arrangement.

20. The memory device of claim 19, further comprising a completion queue manager.

* * * * *